United States Patent
Allen et al.

(10) Patent No.: US 7,235,276 B2
(45) Date of Patent: Jun. 26, 2007

(54) HIGH PROTEIN PUFFED FOOD PRODUCT AND METHOD OF PREPARATION

(75) Inventors: Patrick E. Allen, Monticello, MN (US); Gregory Flickinger, Chanhassen, MN (US); Terry T. Kirihara, Bloomington, MN (US); Steven C. Robie, Plymouth, MN (US)

(73) Assignee: General Mills IP Holdings II, LLC, Minneapolis, MN (US)

( * ) Notice: Subject to any disclaimer, the term of this patent is extended or adjusted under 35 U.S.C. 154(b) by 679 days.

(21) Appl. No.: 10/669,222

(22) Filed: Sep. 24, 2003

(65) Prior Publication Data

US 2005/0064079 A1    Mar. 24, 2005

(51) Int. Cl.
*A23L 1/18* (2006.01)

(52) U.S. Cl. ............... 426/549; 426/446; 426/448; 426/449; 426/450; 426/516; 426/550; 426/559; 426/620; 426/639; 426/640

(58) Field of Classification Search ........... 426/549, 426/550, 559, 620, 639, 640, 446, 448, 449, 426/450, 516
See application file for complete search history.

(56) References Cited

U.S. PATENT DOCUMENTS

| | | | |
|---|---|---|---|
| 3,689,279 A | 9/1972 | Bedenk et al. | |
| 3,814,824 A | 6/1974 | Bedenk et al. | |
| 4,097,613 A | 6/1978 | DeLauder et al. | |
| 4,790,996 A * | 12/1988 | Roush et al. | 426/458 |
| 5,151,283 A | 9/1992 | Foehse et al. | |
| 6,010,732 A | 1/2000 | Van Lengerich et al. | |
| 6,210,741 B1 | 4/2001 | Van Lengerich et al. | |
| 6,242,033 B1 * | 6/2001 | Sander | 426/559 |
| 6,303,177 B1 | 10/2001 | Ning et al. | |
| 6,391,374 B1 | 5/2002 | Gray et al. | |
| 6,558,718 B1 * | 5/2003 | Evenson et al. | 426/72 |
| 6,592,915 B1 | 7/2003 | Froseth et al. | |

\* cited by examiner

*Primary Examiner*—Helen Pratt
(74) *Attorney, Agent, or Firm*—John A. O'Toole; Everett G. Diederiks, Jr.; Douglas J. Taylor

(57) ABSTRACT

Disclosed are ready-to-eat puffed dried food products that are high both in protein and in fiber. The cereals contain sufficient amounts of at least one protein ingredient to provide a total protein content about 50% to 75% (dry weight) of the cooked food product; sufficient amounts of at least one dietary fiber ingredient to provide a total fiber content of about 1-45% (dry weight); and sufficient amounts of a starch containing ingredient to provide a starch content of about 5-45%. The food products have a crush strength raging from about 0.25 to 3.5 kg/cm$^3$.

48 Claims, No Drawings

HIGH PROTEIN PUFFED FOOD PRODUCT AND METHOD OF PREPARATION

BACKGROUND OF THE INVENTION

The present invention relates to food products and to their methods of preparation. More particularly, the present invention relates high protein puffed ready-to-eat food products and to their methods of preparation.

Obesity is a rapidly growing health concern worldwide. A high protein, low carbohydrate is one popular diet approach to weight reduction or maintenance.

In addition to conventional meat and dairy products that are naturally high in proteins, a wide variety of dry mix products as well as ready-to-eat foods are available. For example, dry powder mixes for addition to liquids (e.g., milk, water or juices) for preparing various high protein fluid blends or shakes are well known. Also, various high protein formulations are provided in convenient ready-to-eat bar ("RTE") form. While such bars can contain high levels of protein, such products are usually high in moisture (i.e., have water activities higher than 0.45). In other variations, such dry mixes or bar products might also include high levels of quickly available sugars to ostensibly facilitate athletic activities (colloquially sometimes referred to as "power bars").

Regrettably, many such high protein products have such poor organoleptic properties as to require uncommon motivation for even repeat consumption let alone to become an effective dietary component of an effective weight loss or even weight management program.

In other forms, ready-to-eat cereals have been specially formulated for those who are weight conscious. Generally, these products comprise cooked cereal dough formulations in various conventional RTE cereal forms that are fortified with added protein. While popular, such products generally comprise high levels of carbohydrates and generally comprise less than 50% protein.

While high protein RTE food products are conceptually popular, formulating dry ready-to-eat food products that are both higher than 50% protein (dry weight basis) and that taste good is difficult. High protein food products can suffer off flavors from such components as soy or whey proteins. Also, dry high protein food products can suffer from an unpalatable texture that is often hard or glassy. Such off flavors become increasingly noticeable and difficult to mask and the glassy texture more severe at higher protein concentrations.

High protein puffed products have long been known (see, for example, U.S. Pat. No. 3,689,279 (issued to) and U.S. Pat. No. 3,814,824 "Breakfast Cereals Containing Soy Material and Sodium Bicarbonate" (issued Jun. 4, 1974 to Bedenk et al.). While puffed to some degree and of some what improved flavor, such products have not found consumer acceptance due to an undesirably hard or glassy texture.

The present invention provides improvements to such puffed high protein content Ready To Eat products. In one aspect, the improvement resides in the including sufficient amounts of fiber in the high protein formulation to reduce glassy textual attributes to provide a softer product. In another aspect, the present invention provides improvements in selecting high-speed extruder to directly expand the present high protein content formulations to provide the present highly puffed products that are characterized in part by the present low density range.

High-speed cooker extruder especially twin screw extruder for the provision of puffed ready-to-eat cereal products is known (see, for example, U.S. Pat. No. 6,210,741 "Grain Based Extruded Product Operation" issued Apr. 3, 2001 to van Lengerich et al.). The '741 patent, however, is concerned with providing expanded cooked cereal dough pieces of unique texture by direct expansion especially those containing high levels of sugar. In contrast, the present invention provides improvements to the teachings of the '741 patent by providing high protein low carbohydrate (especially low sugar) products.

The present invention provides puffed ready-to-eat cereal products that are not only high in protein content but also are high in fiber content.

In addition to providing high levels of protein, the present cereal compositions additionally comprise high levels of fiber. While providing consumer acceptable high protein R-T-E presents formidable challenges, providing such high protein cereals that are also high in fiber content is even more difficult since the amount of starchy constituent is necessary decreased in direct proportion to the increases in fiber and protein.

Notwithstanding the high levels of both protein and fiber, the present cereal compositions provide R-T-E cereals especially those in the form of puffed pieces, the present products exhibit good organoleptic eating qualities in addition to their desirable nutritional profile of high fiber and protein content.

Surprisingly, a wide variety of high soluble fiber R-T-E cereal products can be provided that are almost indistinguishable in taste and texture from their counterparts that are not fortified with fiber when that fiber is supplied by inulin. Such high fiber high quality R-T-E cereals can be provided from cooked cereal doughs that are fortified with soluble fiber provided by inulin within certain concentrations. In its method aspect, the present invention provides methods for preparing such novel R-T-E cereal products.

BRIEF SUMMARY OF THE INVENTION

The present invention provides high protein and fiber containing ready-to-eat puffed dried food products that are high both in protein and in fiber.

The present products include
  sufficient amounts of at least one protein ingredient to provide a total protein content about 50% to 75% (dry weight) of the cooked food product;
  sufficient amounts of at least one dietary fiber ingredient to provide a total fiber content of about 1-45% (dry weight);
  sufficient amounts of a starch containing ingredient to provide a starch content of about 5-45%.

The products have:
a fat content is 2% or less;
A density ranging from about 0.1 to 0.30 g/cc.;
A moisture content of less than 5%;
a crush strength raging from about 0.25 to 3.5 kg/cm$^3$ The products in preferred form are provided in the form of pieces having piece counts ranging from about 1-40/g. and a sugar(s) content of less than 5%.

In its method aspect, the present invention resides in methods for preparing the present high protein and fiber containing food compositions and finished R-T-E products prepared therefrom. In one embodiment, the methods comprise
A. providing a hydrated, hot, worked, expandable dough or plastic mass in an extruder having at least one screw comprising a protein ingredient, a fiber ingredient; and a starchy ingredient having a gelatinized starch component;

B. extruding the dough or plastic mass under conditions to directly expand upon extrusion and forming into the expanded mass into puffed pieces; and, C. drying the puffed pieces to form high protein and fiber containing finished food products.

sufficient amounts of at least one protein ingredient to provide a total protein content about 50% to 75% (dry weight) of the food product;

sufficient amounts of at least one dietary fiber ingredient to provide a total fiber content of about 1-35% (dry weight); and, sufficient amounts of a starch containing ingredient to provide a starch content of about 5-25%;

wherein the dough has a moisture content ranging from about 8% to 25%;

DETAILED DESCRIPTION OF THE INVENTION

The present invention relates to food doughs containing high levels of both fiber and protein, to finished dried RTE products prepared therefrom especially R-T-E cereals and to methods for their preparation. Each of these product constituents, as well as methods for their preparation and use are described in detail below.

Throughout the specification and claims, percentages are by weight (dry basis) and temperatures in degrees Centigrade, unless otherwise indicated. All patents or applications referenced are hereby incorporated by referenced.

Protein

The cooked cereal dough compositions comprise sufficient amounts of at least one protein ingredient to provide a total protein content of about 50% to 75% (dry weight), preferably about 50% to 65%. Since the protein levels of the present products are high, preferred for use herein are protein sources that are high in protein content although minor levels of lower protein content materials can also be employed. Protein sources can include soy protein, soy flour, soy protein isolate, whey protein isolate, casein, gelatin, legume protein isolates, soy protein concentrate, egg albumin or egg white, wheat protein concentrate, legume protein concentrates and mixtures thereof. While certain high protein concentrate materials such as corn and wheat zein and egg white can be used, such materials are not preferred due to their high cost per kg compared to such materials as soy protein isolate or whey protein isolate.

Preferred for use herein to provide the protein ingredient are materials selected from the group consisting of, soy flour or meal, soy protein, soy protein concentrate, soy protein isolate, whey protein, whey protein concentrate, whey protein isolate, casein, legume protein isolates, and mixtures thereof.

In preferred embodiments at least two protein ingredients are combined to provide the desired protein levels herein. When a single protein ingredient is used, even high quality protein ingredients having reduced off flavors, the off flavors that are characteristic of this ingredient are more pronounced and are difficult to mask or minimize. For example, in preferred embodiments, the present products comprise a whey based or derived protein ingredient and a soy based or derived ingredient. Preferably, the whey based or derive protein ingredient has saved weight ratio to the soy-based or derived ingredient ranging from about 1:2 to about 5:1, preferably ranging from about 1:1 to about 2:1. for example, in a preferred embodiment, the present products comprise whey protein isolate and soy protein isolate in a weight ratio of about 1.1:1.

In more preferred embodiments, at least three protein ingredients are combined to provide desired protein levels herein.

Fiber

The present for products additionally comprise sufficient amounts of at least one dietary fiber ingredient to provide a total fiber content of about 1-35% (dry weight). In addition to providing to the nutritional benefits of fiber, the present a fiber ingredient importantly functions two, it is believed, to breakup of the protein bonds to minimize the glassy or tough texture thereby to enhance the textual attributes of the present products.

Fiber ingredients suitable for use herein include, but are not limited to, powdered cellulose, carboxylmethyl cellulose, oat bran, corn bran, wheat bran, rice bran, barley bran, Hemi cellulose, Fructo-oligo-saccarides ("FOS") such as inulin, Guar Gum, Gum Arabicum, fiber from fruits (such as apples, oranges, grapes, berries, or other fruits) or fruit fiber, and mixtures Generally, higher molecular weight fiber ingredients function better to inhibit the protein bond strength compared to lower molecular weight fiber materials. While such lower molecular weight fiber materials such as soluble fibers can be used such materials generally are required to be used at higher concentrations in the present food products. In more preferred embodiments, at least two fiber ingredients are employed herein to provide the desired fiber levels. Selection of two or more fiber ingredients are preferred to provide the desired the fiber level allowing the fiber ingredient balance to lessen the attributes of the various fiber ingredients creating a bland flavor profile.

In the preferred embodiments, the fiber ingredient includes a member selected from the group consisting off powdered cellulose, carboxymethyl cellulose, oat bran, corn bran, wheat bran, rice bran, inulin, sugar beet fiber and mixtures thereof.

In preferred embodiments, at least a portion of the fiber ingredient is supplied by powdered cellulose. Since powdered cellulose has such a large molecular weight only small quantities are required to provide disruption of being protein matrix of the present puffed food products to provide a soft not glassy texture.

Among cereal brans, oat bran is an especially desirable fiber ingredient in the present cereal compositions. Oat bran has a fiber fraction in addition to the high cereal or starchy fraction. Oat bran is a concentrated source of a soluble fiber and can comprise at least 6% soluble fiber (about 1.7 g/oz) as well as at least 6% insoluble fiber (about 1.7 g/oz). Accordingly, inclusion of oat bran into the present R-T-E composition simultaneously can provide the present essential starchy cereal component, a supplemental soluble fiber component, and an insoluble fiber component.

Sugar beet fiber can comprise up to 80% total dietary fiber with about 20% soluble fiber and 60% insoluble fiber.

Generally, inulin is the clean, dried fibrous material which is separated by extraction from, for example, chicory, onions and Jerusalem artichokes and other common plant sources. Inulin is available in various commercial grade varieties. Pure inulin is commercially available from, for example, Rhone-Poulenc in the U.S. under the trade name RAFTILINE® and from Imperial Suicker Unie, LLC in Europe. Pure inulin has an average degree of polymerization ("DP") of about 9 to 10. Less preferred for use herein are less pure inulin source materials such as a dried Jerusalem artichoke flour, deflavored onion flour and mixtures thereof. Also useful herein are oligofructose materials available under the RAFTILOSE trade name from Rhone-Poulenc. Such materials are plant derived and have a DP of about 2 to 7, i.e., with fructose claims of up to about seven fructose units.

FOS materials are also available commercially such as from GTC Nutrition Company, Westminster, CO. FOS materials have an average degree of polymerization ("DP") ranging from about 2-4 polyfructans. Due to their lower molecular weight, the FOS materials have a greater solubility in water. FOS materials have a slight sweetness to their taste. A further advantage is that the FOS materials when topically applied form a clear, almost undetectable coating. As a result, FOS materials are especially suitable for topical application.

Starch

The present food compositions additionally comprise a starch ingredient(s) in amounts sufficient to provide about 5% to 45%, preferably about 10%-30%, starch in the food products and for best results about 15%-25%. The starchy cereal component includes not only pure added cereal flours or other granulations but also that starchy fraction provided by other ingredients such as oat bran or soy protein The starch component can comprise any conventionally employed starch or cereal flour ingredient, for use in a ready-to-eat cereal. Exemplary suitable starchy cereals include cereal flours from major cereal grains including wheat, rice, corn (maize), oats, barley, rye, or and mixtures thereof. The flours preferably are those flour fractions with the germ fraction or husk fraction removed. And more preferred embodiments starch fractions are isolated from the cereal flowers including, for example cornstarch, wheat starch, rice starch, and mixtures thereof. Also useful herein as the starch ingredient are various treated starches including pre-gelatinized starches and/or modified starches. Of course, the R-T-E food art is well developed and the skilled artisan will have no difficulty selecting suitable starchy materials for use herein.

Especially preferred for use as a starchy component in the present cereal compositions is a cereal ingredient selected from the group consisting of rice, corn, and mixtures thereof. Preferred for use herein is a mixture of rice and corn, especially rice starch and cornstarch. Most preferred is an approximately equal mixture of rice and corn with a small preponderance of rice in view of the organoleptic attributes of rice flour in R-T-E of food products herein.

Preferred for use herein to supply the soluble fiber constituent(s) level is a fruto oligo saccharide ("FOS") material. Inulin is a particularly useful FOS material due to its cost and ready availability in commercial quantities and convenient grades. Inulin is well known and is a staple of commerce. In preferred form, pure inulin is employed rather than less pure vegetable sources of inulin such as Jerusalem artichoke powder. Inulin is available in a wide variety of grades and forms including both as a dry powder and in liquid form as a concentrated solution.

Sugar

In less preferred embodiments, the present cereal dough composition can additionally comprise about 0.1% to about 20% (dry weight) by weight sugar(s) or, synonymously herein, added nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E products, when the sugar(s) component comprises from about 2% to about 10% by weight of the composition. In preferred embodiments, the present dried cooked cereal dough and products prepared therefrom are desirably free of added nutritive carbohydrate sweetening agents. In one preferred embodiment, the to food products are characterized by a sugar content of 5% or less and for best results 2% or less. In these low sugar embodiments, desired sweetness can be provided by additionally including a high potency sweetener.

Fat

Of coarse, some level of native cereal grain fat constituents are provided by the cereal ingredients employed herein. In a preferred embodiment for ready-to-eat food products, the present cereal compositions are further essentially defined in part by low added fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions is preferably less than about 3%, preferably less than about 2%. Preferably, the R-T-E food product is substantially free of any fat or oil incorporated into the cooked cereal dough. Such "added fat" is to be distinguished from "absorbed fat" that is picked up during deep fat frying used to prepare finished snack products herein. In more preferred embodiments, R-T-E food products are further characterized as free of any absorbed fat.

As described below, the present puffed food products can be provided with a topical coating. In certain variations, this topical coating can include a fat ingredient.

Adjuvant Ingredients

If desired, the present food dough products can additionally include a variety of materials designed to improve their aesthetic, organoleptic or nutritional qualities. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 5%, preferably about 0.1% to 2% dry weight of the cereal composition.

One especially useful material is common salt. Desirably, the salt comprises about 0.1 to 5%, preferably about 0.5 to 4.0% of the food products.

Fiber, especially insoluble fiber, is believed to adversely affect selected mineral and vitamin absorption. Accordingly, in highly preferred embodiments, in particular, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

If desired, the present R-T-E cereal composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% by weight of the cereal composition Still another flavor ingredient is a malt syrup flavor ingredient. The malt syrup comprises about 1% to 8% (dry basis), preferably about 2% to 5%.

A preferred adjuvant material is a high potency sweetener. Preferred for use herein as the high potency sweetener is an ingredient selected from the group consisting of aspartame, sucralose, potassium acesulfame, and mixtures thereof. Alitame, neotame, saccharin and cyclamates can also be employed although, current food regulations do not permit usage of these sweeteners in certain products. Thaumatin can also be used and provides the advantage of flavor masking off flavors. Also useful herein are trehelose, taglatose and mixtures thereof. Preferred for use herein are heat resistant or temperature stable sweeteners such as sucralose, potassium acesulfame since such materials can conveniently be added together with the balance of other materials and subjected to a cereal cooking step with minimal loss of sweetness. However, these sweeteners together with aspartame which is a more heat susceptible sweetener can also be topically applied to provide desired levels of sweetness.

The present puffed food products are dried to a moisture content ranging from about 1% to about 5%. Surprisingly, unlike starch based RTE cereal products, that are softer at higher moisture values within the recited range, the present puffed high-protein food products surprisingly become undesirably tougher with increasing moisture content in the dry state. Accordingly, preferred herein are those embodiments characterized by low moisture contents all of about 1% to 4%.

Unlike other high-protein puffed up food products of similar composition, the present food products exhibit a desirable softer eating texture and quality unlike the hard or glassy textures that characterize known puffed high-protein food pieces. In part, the present improved texture is provided by paying lower density more highly puffed feature of the present food products. Additionally, inclusion of fiber of the type and the levels as described herein, it is believed, desirably interfere with the strength of the protein matrix formed into puffed food products herein and that in part lead to the softer texture of the present products.

The softer texture of the present invention as well as the tougher texture of the currently available high-protein puffed pieces can be measured and expressed by their crush strength value. Suitable for use herein to measure crush strength is a Texture Analyzer instrument available from Stable Microsystems Ltd., and distributed by Texture Technologies, Inc. in the US such as model "TA.HD". The instrument includes a measurement cylindrical 2.5 cm diameter and 4 cm high chamber. The chamber is filled full with a quantity of sample pieces at room temperature (20° C.). The bulk volume of sample is thus about 19.6 cc. A cylindrical probe 25 mm in diameter is lowered into the cylinder to a distance that was one half the height of the cylinder (50% deformation). The sample pieces are broken by the descending probe and are partially crushed as the probe is lowered. The peak force values are measure and recalculated or expressed as force in kilograms per cubic centimeter.

The present puffed the full compositions can be characterized by a crush strength all of less than 5 kg per cubic centimeter ("kg/cc."), preferably less than 2.5 kg per cubic centimeter, and for best results <2 kilograms per cubic centimeter. In contrast, high-protein puffed food products currently available are characterized by crushed strength values of >7 kg per cubic centimeter. For comparison, a popular corn based puffed RTE cereal marketed under the KIX mark having an equivalent specific density have a crushed strength value of about 0.5 kg per cubic centimeter. Thus, while the present high-protein fiber bearing puffed food pieces are not quite as soft as the desirable soft texture of the puffed corn based RTE cereal product, and the present puffed food products are nonetheless unexpectedly superior in texture compared to high-protein puffed pieces that are currently available.

The dough compositions of the present invention can be in a variety of forms. For example, the food dough compositions can be in the form of spheres or ovoids, strands, rings or puffed "O's", flakes or ribbons (i.e., pieces that are planar in shape) and mixtures thereof or other puffed shapes. For example, the puffed pieces can be provided with a shape that is reminiscent of if figuring such as an animal, vehicle, or cartoon character. Also, dished pieces can be shaped to have a regular geometric shapes such as a triangle.

The present puffed pieces can be sized to have they pieces account ranging from about number 2-400 per 10 g., preferably ranging from about 10-200 per 10 g. Of course, larger size pieces fine suitability for use as a snack food item. Smaller pieces find suitability for use as a ready-to-eat cereal per se, or as a complement or ingredient of other composite food products.

In more preferred forms, the present products are provided as blend all at least two fractions each characterized by a different size, shape, color, flavor of the puffed products. Even more preferred forms comprise the blend of at least three fractions each fraction characterized by a different product attribute especially shape.

In one embodiment, the present invention provides products comprising a blend or medley of about 10%-40% of the first fraction in the form of balls or ovoid; a second fraction comprising about 10%-40% of strands (especially having a diameter of 0.5-2 millimeter and an aspect ratio ranging from about 2:1-10:1); and a third fraction comprising about 10%-40% of flakes or ribbons having a with of about 10-20 millimeters, a height of about 1-10 millimeters and a length ranging from about 10 to 40 mm.

For example, the present puffed pieces can be added to an otherwise conventional RTE cereal to increase the protein content thereof. In other variations, the present pieces can be used as a food ingredient such as in the fabrication of a cereal bar whether used alone or in combination with other conventional RTE cereal pieces bound together by a binder such as a sugar syrup binder. In still other variations, the products can be used as an additive ingredient or assay topical ingredient such as a topping for ice cream.

While the presence of food products are intended for consumption, and it will be appreciated that in the present food compositions and find suitability for use as in an animal foods and especially for domestic companion animals such as cats and dogs. In while the present food products can be consumed by animals such as domestic companion animals, the present food products are not intended to be full or replacement rations for such animals in that the present food compositions are not intended to provide a complete and balanced nutritional profile for such animals.

In preferred form, the present products are near neutral in pH ranging from about 6.0 to about 7.5 and are free of added sodium bicarbonate.

The present products are characterized by a low glycemic index (i.e., less than 100, with white bread been 100), the speed at which different foods affect blood glucose levels and compared the numbers to a slice of white bread Surprisingly, the present puffed food products provide improved bowl life when consumed with cold milk relative two RTE cereal products of equivalent shape intensity. It improvements of up to 50% greater bowl life can be realized.

In still another variation, the present puffed food products find suitability for use as an ingredient in the food products described in U.S. Ser. No. 10/209,707 entitled "Food Product and Method of Preparation" filed Aug. 1, 2002 to Dean Funk. and incorporated herein by reference. In that application, a food product is described comprising a first soft plastic non-tangible major portion having a water activity of 0.5 or less such as a fruit paste and about 1%-15% of a second food portion of direct small expanded puffed particulates fabricated from a cooked cereal dough. The present high-protein puffed food pieces, especially those characterized by higher piece counts such as 50-200 per 10 g, can be used in full or partial substitution for the small direct expanded puffed particulates described in U.S. Ser. No. 10/209,707.

If desired, the puffed food products can be provided with a topical coating. The topical coating can range to a quantity of puffed food pieces forming a base in a weight ratio of coating to base ranging from about 1 to about 200:100, preferably about 30-70:100.

In preferred embodiments, the topical coding includes a sweetener ingredient. The sweetener ingredient can be provided by one or more due to two carbohydrate sweetening ingredients such as sucrose and corn syrup. In other variations, the sweetener can comprise a high potency sweetener such as sucrose, aspartame, potassium acesulfame, and mixtures thereof. Of course combinations of new to of carbohydrate sweeteners and high potency sweeteners are contemplated. The topical sweetener can additionally include vitamins, flavors colors and the like. In still other variations, the topical coding can include an oil complement. As certain variations, the topical coding can additionally include it particular flavors such as she solids, and blends of cinnamon with sucrose, powdered sugar, chocolate, dried peanut butter flavor or other flavors and combinations thereof.

Method of Preparation

The present invention provides methods of preparing the present puffed high protein fiber containing food products. The present methods comprise forming a hydrated, hot, worked, expandable food dough or plastic mass in an extruder having at least one screw and an exit; extruding the plastic mass under conditions to directly expand upon extrusion; and, forming the expanded mass and to puffed pieces; and, drying the puffed pieces so formed to form the present high protein and fiber content in puffed finished food products.

In practicing the first step of forming the hot expandable food mass, as is well known, a cooked food dough can be prepared by blending various dry ingredients together with water and cooking to gelatinize the starchy components and to develop a cooked flavor. The cooked material can also be mechanically worked to form a cooked cereal dough. The cooking and mechanical work can occur simultaneously or sequentially. The dry ingredients can also include various additives such as sugar(s), salt and mineral salts, e.g., trisodium phosphate, and starches. In addition to water, various liquid ingredients such as corn (maize) or malt syrups can be added. A cooked cereal mash is quite similar except that larger sized particles such as whole grains or cut grains are cooked rather than cereal flour ingredients.

Broadly, the present invention provides food compositions that essentially comprise a cooked cereal dough or cereal having about 10 to 25% moisture. The amount of moisture depends, in part, upon the particular protein ingredients, desired intermediate or finished products, cooking equipment and techniques employed.

In one preferred variation, an extruder having at least one screw, and especially a twin screw extruder, is employed to which the various dry ingredients and moisture are added and are combined with mechanical work and supplemental heating, if desired, to hydrate and cook the starch ingredient(s) and to work the ingredients to form a hot hydrated gelatinized elastic or plastic food dough. A twin screw extruder can perform the mixing, heating, liquefying and forming steps all in a single piece of equipment. As a result, a twin screw extruder provides the advantage of a practical and commercially economical technique for practicing the invention.

In a more preferred variation, the feed material or blend with adjuvant materials and moisture is fed to a cooker extruder having a rotating screw capable of both high rates of rotation and rapidly imparting high rates of mechanical energy to the feed material. By high rates of rotation herein is meant capable of at least 450 or 500 rpm, preferably greater than 1000 rpm.

The feed materials can additionally include about 1% to 4% of salt (sodium chloride), preferably about 1% to about 2%. If desired, potassium chloride can be used in full or partial substitution. Also, the feed materials blend can additionally comprise about 1% to 10% of a calcium constituent to provide calcium fortification. Useful calcium materials include oyster shell, calcium carbonate, calcium phosphate salts, and mixtures thereof. If desired, a chocolate flavoring especially defatted cocoa powder can be used at about 1% to about 10% (dry weight basis) of the grain based blend.

Extruder length is also an important process parameter. Extruder lengths are typically expressed in relation to their barrel diameter or "L/D" ratio. Conventional cooker extruders are characterized by L/D ratios ranging from about 12 to 40. Broadly, such extruder can be used and useful extruders herein can be character by L/D ranging from about 4 to about 40, preferably from about 8 to about 30 and most preferably from about 16 to 24.

The inlet or feed temperature of the grain based materials or blends can range from ambient temperatures (10° C. to 40° C.) up to about 100° C.

After feeding the feed materials to the cooker extruder, the present methods of preparation can include the sub-step of working the feed material by rotating the extruder screw to impart sufficient amount of mechanical energy to mix, heat and liquefy the feed material to a plasticized mass having at least gelatinization temperatures. Moreover, the screw working serves to compress the feed material and to work the feed material at extremely short residence times.

During the working step, the screw is rotated at operative speeds ranging from about 500 to 1200 RPM (revolutions per minute), preferably about 600-800 RPM. Generally, the use of high shaft rotation speeds should lead to imparting high shear to the present food products. Cooked cereal doughs that have been subjected to high shear form RTE cereals and cooked cereal products that upon consumption exhibit undesirable tooth packing. Surprisingly, however, in the present invention, notwithstanding the utilization of extremely high shaft rotation rates, the finished products exhibit very low levels of undesirable tooth compaction.

The present working step is practiced to impart extremely high Specific Mechanical Energy ("SME") to the grain based material. As its name implies, SME is used to characterize the amount of mechanical energy or work that the extruder imparts to the material being worked. Conventional extruder cooking imparts about 90 to 150 W-hr./kg. (or, equivalently, 0.09 to 0.15 kW-hr./kg.) of SME to the cooked cereal dough. The present invention is practiced so as to impart at least 100 to 450 W-hr./kg. of SME to the plastic mass from which the present high protein products are prepared.

The temperature of the plasticized mass is higher than in conventional extruder cooking methods. Measured immediately upstream of the die orifice, the mass temperature ranges from about 110° C.-180° C. ($\approx$230° F. to 360° F.). With exit temperatures substantially exceeding 180° C., puffed food products can develop an undesirable burnt flavor. However, at slightly lower exit temperatures, the puffed products can develop and exhibit a desirable toasted flavor.

The plastic mass or pressure within the extruder immediately prior to exiting the die orifice can usefully range from about 2500 to 25,000 kPa. (360 to 3625 PSI).

The combination of high rotational speeds and short extruder lengths can provide extremely short residence times. Useful extruder residence times herein can range from about 10-150 seconds. Especially for those variations having shorter residence times, e.g., under 30 seconds, it is speculated herein that such short residence times, even at such higher pressures and temperatures, minimize the development of scorching.

Thereafter, the grain based product is forced or extruded through at least one die orifice extruding the plastic mass under conditions to directly expand upon extrusion and forming the expanded mass or extrudate into pieces. Depending upon the size and shape of the orifice, the extrudate can be in the form of spheres, ovoids, filaments, strands, ropes, ribbons, etc. Of course, shaped orifices can be used to give a cross sectional shape to the extrudate such as a figurine. The forms can regular or irregular.

Immediately after extrusion due to the moisture loss of directly expansion, the expanded extrudate mass or particles formed there from can range in moisture from about 8% to 15% and prior to present finish drying step. In certain variations, the present methods of preparation can be practiced such as to require minimal or even no finish drying to obtain finished pieces at shelf stable finish moisture contents of about 1-6%.

If desired, the cooker extruder system can be equipped with a means for forming the extruded expanded mass into individual pieces such as a reciprocating or rotating knife such as a rotating knife having sufficient number of blades and operating at sufficient speed as to separate the exiting extrudate into equal pieces having a L/D ratio between 0.1 and 10 such as having about 2-32 blades and operating at about 1000 to 4000 RPM to sever the extrudate rope into individually sized and shaped pieces.

The product pieces so prepared are particularly suitable for use as RTE cereals or, generally in slightly larger pieces, can be used as grain based snack products. In addition to being of normal crispiness, the products of the present invention have a softer texture.

Conveniently, as described above, inulin can be admixed with other dry cereal ingredients and water that is then cooked to form a cooked cereal dough. The high protein content cooked cereal dough containing high levels of both soluble and insoluble fiber so prepared is suitable for use as an intermediate product such as added ingredient blended with other dried cereal pieces to form a blend in the commercial production of R-T-E cereal products.

The present cereal compositions can be fabricated into any of a variety of common R-T-E cereal forms including biscuits, flakes, puffs, shreds, squares or any common R-T-E cereal or cereal based snack product form, shape or size. The present cereal compositions can also be formulated and fabricated so as to provide puff or puffed cereals of various shapes and sizes such as "O's".

In another preferred variation, the cooked cereal dough is formed into individual "O" shaped or toroid shaped pellets or pieces or rings, biscuits, shreds, stars, figurines, letters, symbols, numbers, spheres or other geometric shapes, nuggets, or even irregular shapes.

The size or weight of the individual pieces can vary depending in part upon the desired end use application. For example, the finished form can be in the form of flakes suitable for use as an R-T-E cereal. Such products can have higher piece counts such as 10-400, preferably about 30-150 per 10 grams. In other variations, the flakes can be thicker (0.5-2 mm) and larger suitable for preparing grain based snack products such as by deep fat frying to form chips. Such products can have smaller piece counts such as 1-10 per 10 grams.

The present methods can further comprise the step of drying the expanded shaped and sized individual pieces to form finished cereal products containing high levels of both fiber and protein.

The dough can be extruded under conditions of temperature and pressure so as to puff and expand (the "direct expansion" technique) and sectioned or cut into individual pieces to form individual expanded puffed R-T-E cereal or snack pieces.

In another variation, the drying step can involve heating the pieces under conditions that not only dry the piece but also cause the piece to expand to form dried and puffed or flaked finished pieces. For example, pellets can be gun puffed to form dried puffed R-T-E cereal products having a density ranging from about 0.15 to 0.5 g/cc. The wet flakes can be toasted to dry, expand and tenderize to form finished R-T-E cereal flakes.

In still another variation, the dough can be extruded under conditions of temperature and pressure so as to puff and expand (the "direct expansion" technique) and sectioned or cut into individual pieces to form individual expanded or puffed R-T-E cereal or snack pieces.

In still other variations the finish drying can be practiced by microwave heating or by radiant heating or infrared heating. In still other variations, the finish drying can be practiced by deep fat frying to provide a fried snack product.

In the preferred form, the finished dried high fiber high protein cooked cereal dough products are in the form suitable for an R-T-E cereal. The flakes can form a loose mixture of particles that can be packaged in conventional manner for distribution and sale as a packaged consumer food item. In still other variations, a quantity of the finished particles are combined with a binder such as a sugar binder and formed into a cereal bar.

Applying a Topical Coating

The present methods can additionally include a step of applying a topical coating to the dried cooked cereal dough pieces to form a coated dried cereal piece product. The cereal pieces, however formed, can optionally be provided with a topical coating and subsequently dried to remove the added moisture from the coating solution to form coated R-T-E finished cereal pieces. In one variation, the topical coating is a pre-sweetener coating intended to provide a sweet flavor to cereal base such as one having a sugar content of less than 2%. The pre-sweetener coating can include various sugars and/or high potency sweeteners such as aspartame, sucralose or potassium acesulfame. In other variations, an oil topical coating optionally with salt and/or flavors, is applied to form finished dried snack products.

The cereal pieces, however formed, can optionally be provided with a topical sugar coating and subsequently dried to remove the added moisture from the sugar coating solution to form presweetened R-T-E finished cereal pieces. In other variations, an oil topical coating optionally with salt and/or flavors, is applied to form finished dried snack products.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 10:100 to about 40:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In another variation, the topical coating application can include vitamin fortification especially of heat intolerant vitamins. For example, the finished dried flakes can then further vitamin fortified with heat labile vitamins A, D, and C by an aqueous dispersion. The vitamins are added to the flakes in an enrober to obtain a finished product having about 2.5% moisture.

In those variations in which the inulin material is added to the sugar coating, the sugar coating slurry can comprise about 1 to 40% inulin. In other variations, the sugar coating solution is applied as one spray or stream onto the cereal base while simultaneously or concurrently applying the inulin such as in a separate aqueous solution. If added as a separate aqueous solution, then the inulin is present in that solution at its maximum solubility level so as to minimize moisture addition that must be subsequently removed by drying.

The R-T-E cereal pieces so prepared can then be conventionally packaged for distribution and sale.

The R-T-E cereals of the present invention can be consumed in a conventional manner to obtain the nutritional and physiological benefits of a high protein and high fiber cereal food. A surprising advantage of the present R-T-E cereals is that the fiber is nearly "invisible", that is, even high levels of fiber are barely organoleptically discernible in the finished product.

The finished dried R-T-E cereal and cereal based snack products fabricated from the cooked cereal doughs herein are useful as fiber fortified food products. The products are characterized by good flavor, good texture and other favorable organoleptic attributes. Notwithstanding their highly acceptable taste, appearance and texture attributes, the products are nonetheless characterized as having high levels of protein and fiber. Notwithstanding the high levels of soluble fiber, the present finished products are remarkably free of the undesirably slimy mouth feel heretofore associated with finished dried cereal products high in soluble fiber content. Also, notwithstanding their high insoluble fiber content, the present products do not have a gritty texture even though they are low in fat content.

R-T-E cereals are further characterized as free of any absorbed fat.

In still other variations, bulk quantities of the finished R-T-E cereal pieces can be admixed with various dried particulate ingredients to provide blended R-T-E cereal products. Such dried particulate ingredients can include, for example, dried fruit pieces, nut or nut pieces, dried marshmallows, pretzels, agglomerated nut and cereal pieces or nuggets or clusters, especially those nutrient clusters described in U.S. Pat. No. 6,558,718 "Nutrient Clusters For Food Products And Methods Of Preparation" (issued May 6, 2003 to Evenson et al.), and mixtures thereof. The blended R-T-E cereal products can comprise about 1% to about 50% added dried particulates, preferably about 15-35% added dried particulates and the balance the present dried R-T-E cereal pieces.

The R-T-E cereal pieces so prepared can then be conventionally packaged for distribution and sale.

EXAMPLE 1

A ready-to-eat food product composition of the present invention in the form of having high levels of soluble fiber is prepared according to the following procedure. A dry blend, a wet blend and a sugar coating composition were separately prepared having the respective formulations:

| Ingredients | Percent by Weight |
| --- | --- |
| Soy Protein Isolate (Profam 891 from The Archer Daniels Midland Company | 25.78% |
| Whey Protein Isolate (BiPRO from DAVISCO Foods International Inc.) | 28.91% |
| Rice Starch (Flour) | 25.78% |
| Inulin (Raftaline GR from Orafti | 10.97% |
| Oat Fiber | 5.49% |
| Salt | 0.33% |
| | 100.% |

All of the dry ingredients were mixed into a single batch and fed to a Krupp Werner Pfleiderer ZSK-25 twin screw extruder fit with a single round 0.152 inch diameter die. The dry ingredients were fed at a rate 320 g/min. Barrel 1 was at ambient temperature, barrels 2 and 3 were set at 80° C., barrels 4 and 5 were set at 105° C., and barrels (3.8 mm) 6 and 7 were set at 115° C. The die temperature at the extruder exit was 48 C. The barrel temperatures are maintained at a level to keep the die temperature below 150 C. in order to minimize or eliminate product burning or charring. Water was added at the end of the first barrel section at a rate of 62.2 g/min. The product was processed at a screw speed of 600 RPM (revolutions per minute) using a screw configuration containing one mixing element and 5 reverse elements. The resulting torque on the system was 42%, yielding an SME of 173 W-Hr/Kg. With a die pressure of 590 psi, the ropes were face cut into balls with a resulting product wet bulk density of 0.1526 g/cm$^3$ (at 11.5% moisture). When the twin screw speed was increased to 1000 RPM with the same ingredient feed rates the barrel temperatures must be decreased to 80° C. for barrels ⅔, 98° C. for barrels ⅘, and 97° C. for barrels 6/7 to maintain a die temperature of 151° C. The SME under these conditions increased to 281 W-Hr/Kg. The die pressure under these conditions dropped to 560 psi while the resulting product wet bulk density decreased to 0.1324 g/cm³ (for product balls at 11.3% moisture). Trays of product samples were dried in a forced air dryer for 90 minutes at 65° C., resulting in a final product moisture of 2.6%. The dried product yielded a bulk density of 0.1391 g/cm³ (228 g/in³) for the material processed at 600 RPM and a bulk density of 0.12 g/cm³ for the material processed at 1000 RPM. The samples produced at 1000 RPM were measured for individual piece density and were found to be 0.221 g/cm³. This density is 86% lower than the protein piece present in Kashi Go Lean™ (0.410 g/cm³) and 30% lower than the Ringger Soy Crisp Rice piece (0.289 g/cm³). The piece count for this product sample was 100 pieces in a 10 g sample. The Kashi Go Lean contains 162 pieces in a 10 g sample and a Ringger Crisp Rice contains 325 pieces in a 10 g sample.

The final dried product base was dried to 2.5% moisture contains 52.6% Protein (27.8% whey protein, 22.7% soy protein, 2.1% rice protein), 19% rice starch, 16.5% fiber (11% soluble fiber, 5.5% insoluble fiber), and the remainder minor ingredients. This product contains only trace concentrations of sugar and fat. The product provides 15.8 g of protein and 4.7 g of total fiber in a 30 g serving.

These products exhibit a texture and eating quality very similar to direct expanded cereals containing little to no protein components. As evidenced by crush strength data collected on the samples described above. The crush strength was measured to be 1.81 kg/cm³. This compares very favorably to uncoated Kix™ puffed corn based RTE cereal, which is a standard direct expanded product produced by General Mills. Uncoated Kix™ puffed corn based RTE cereal exhibits a crush strength of 0.52 kg/cm³. Both the protein balls and the uncoated Kix crush strengths are contrasted by the high values crush strength values exhibited by typical protein pieces such as the Kashi Go Lean protein piece (7.09 kg/cm³) and the Ringger Soy Crisp Rice product (7.35 kg/cm³).

EXAMPLE 2

Small Strands

The same formulation and processing system was used as in Example 1 to produce strands with the point of difference being the use of a single round 0.08 inch diameter die. The dry ingredients were fed at a rate 260 g/min. Barrel 1 was at ambient temperature, barrels 2 and 3 were at 78° C., barrels 4 and 5 were set at 93° C., and barrels 6 and 7 were set at 91° C. The die temperature at the extruder exit was higher than preferred at 156° C. Water was added at the end of the first barrel section at a rate of 54 g/min. The product was processed at a screw speed of 600 RPM. The resulting torque on the system was 56% yielding an SME of 284 W-Hr/Kg. With a die pressure of 1350 psi, the ropes were face cut into strands with a resulting product wet bulk density of 0.1288 g/cm³ (11.1% moisture). Trays of product samples were dried in a forced air dryer for 90 minutes at 65° C., resulting in a final product moisture of 2.4%. The resulting dry bulk density was 0.1172 g/cm³. The piece count for this product sample was 111 in 10 g. The individual piece density was measured to be 0.264 g/cm³.

These products exhibit a texture and eating quality very similar to direct expanded cereals containing little to no protein components. The crush strength was measured to be 1.61 kg/cm³ that is again very comparable to cereal pieces direct expanded using standard ingredients.

EXAMPLE 3

Large Strands

The same formulation and processing system was used as in Example 1 to produce strands with the point of difference being the use of a single round 0.115 inch diameter die. The dry ingredients were fed at a rate 300 g/min. Barrel 1 was at ambient temperature, barrels 2 and 3 were at 80° C., barrels 4 and 5 were set at 100° C., and barrels 6 and 7 were set at 106° C. The die temperature at the extruder exit was higher than preferred at 150° C. Water was added at the end of the first barrel section at a rate of 57.7 g/min. The product was processed at a screw speed of 600 RPM. The resulting torque on the system was 50% yielding an SME of 222 W-Hr/Kg. With a die pressure of 899 psi, the ropes were face cut into strands with a resulting product wet bulk density of 0.1129 g/cm³ (11.7% moisture). Trays of product samples were dried in a forced air dryer for 90 minutes at 65° C., resulting in a final product moisture of 2.6%. The resulting dry bulk density was 0.0958 g/cm³. The piece count for this product sample was 54 in 10 g. The individual piece density was measured to be 0.227 g/cm³.

These products exhibit a texture and eating quality very similar to direct expanded cereals containing little to no protein components. The crush strength was measured to be 1.21 kg/cm³. Again very comparable to cereal pieces direct expanded using standard ingredients.

EXAMPLE 4

Ribbons

The same formulation and processing system was used as in Example 1 to produce ribbons with the point of difference being the use of a single slit die comprised of a 0.032 in width and a 0.502 in length. The dry ingredients were fed at a rate 310 g/min. Barrel 1 was at ambient temperature, barrels 2 and 3 were set at 81° C., barrels 4 and 5 were set at 99° C., and barrels 6 and 7 were set at 102° C. The die temperature at the extruder exit was 141° C. Water was added at the end of the first barrel section at a rate of 56.8 g/min. The product was processed at a screw speed of 600 RPM. The resulting torque on the system was 57% yielding an SME of 248 W-Hr/Kg. With a die pressure of 743 psi, the Ribbons were face cut into chips with a resulting product wet bulk density of 0.1013 g/cm3 (11.5% moisture). Trays of product samples were dried in a forced air dryer for 90 minutes at 65° C., resulting in a final product moisture of 2.1%. The resulting dry bulk density was 0.0921 g/cm³ The piece count for this product sample was 33 in a 10 g sample. The individual piece density was measured to be 0.209 g/cm³.

These products exhibit a texture and eating quality very similar to direct expanded cereals containing little to no protein components. The crush strength was measured to be 1.10 kg/cm³. Again very comparable to cereal pieces direct expanded using standard While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims

The invention claimed is:

1. A ready-to-eat, high protein and high fiber food product fabricated from a food dough, comprising:
   A. sufficient amounts of at least one protein ingredient to provide a total protein content of about 50% to 75% (dry weight) of the food product;
   B. sufficient amounts of at least one dietary fiber ingredient to provide a, high total fiber content of about 16.5-35% (dry weight);
   C. sufficient amounts of a starch containing ingredient to provide a starch content of about 5-45% ; and,
   wherein the food dough has a fat content of 2% or less,
   wherein the food product has a density ranging from about 0.1 to 0.3 g/cc.;
   wherein the food product has a moisture content of less than 5%;
   wherein the food product is high in both protein and fiber, low in fat, soft and non-gritty, while exhibiting a minimum glassy texture.

2. The food product of claim 1 comprising at least two protein ingredients.

3. The food product of claim 2 comprising whey protein isolate and soy protein isolate.

4. The food product of claim 3 wherein the weight ratio of whey protein isolate to soy protein isolate ranges from about 1:2 to about 5:1, and,
   wherein the food product has a crush strength ranging from 0.25 to 3.5 kg per cubic centimeter.

5. The food product of claim 4 wherein the fiber ingredient includes a member selected from the group consisting of powdered cellulose, carboxyl methyl cellulose, oat bran, corn bran, wheat bran, rice bran, inulin, barley bran, and mixtures thereof.

6. The food product of claim 5 additionally comprising a high potency sweetener.

7. The food product of claim 5 wherein the fiber ingredient includes a member selected from the group consisting of powdered cellulose, carboxyl methyl cellulose, oat bran, corn bran, wheat bran, inulin, and mixtures thereof.

8. The food product of claim 5 wherein the starch containing ingredient includes rice starch or rice flour.

9. The food product of claim 2 in the form of a dried food piece having a moisture content of about 2% -6%.

10. The food product of claim 9 wherein the dried food piece includes a topical coating.

11. The food product of claim 10 wherein the topical coating includes a sweetener.

12. The food product of claim 2 wherein the starch containing ingredient is selected from the group consisting of rice starch, corn starch, wheat starch, potato starch, rice flour, corn flour, wheat flour, oat flour and mixtures thereof.

13. The food product of claim 12 additionally comprising about 0.1% to 1% of carboxymethyl cellulose.

14. The food product of claim 2 in the form of pieces having apiece count ranging from about 2-400/10 g.

15. The food product of claim 14 wherein the topical coating includes particulates.

16. The food product of claim 14 having a starch content ranging from about 5-25%.

17. The food product of claim 14 in the form of spheres, ovoids, rings or "O's", ribbons or flakes, shreds and mixtures thereof.

18. The food product of claim 17 additionally comprising dried fruit particles, nut pieces and mixtures thereof.

19. The food product of claim 17 admixed with nutrient cluster particles.

20. The food product of claim 2 which is free of any absorbed fat.

21. The food product of claim 2 additionally including about 0.5% to 4% salt.

22. The food product of claim 2 wherein at least a portion of the fiber ingredient is supplied by oat bran, white wheat bran and mixtures thereof.

23. The food product of claim 2 wherein at least a portion of the protein is provided by an ingredient selected from the group consisting of soy protein isolate, whey protein isolate, casein, legume protein isolates, soy protein concentrate, egg albumin, wheat protein concentrate, legume protein concentrates, and mixtures thereof.

24. The food product of claim 23 wherein the food product is free of soy protein.

25. The food product of claim 23 additionally comprising an ingredient selected from the group consisting of egg powder, lecithin and mixtures thereof.

26. The food product of claim 1 wherein the starch containing ingredient includes rice flour, wheat flour and mixtures thereof.

27. The food product of claim 1 wherein the total fiber content comes from both soluble and insoluble fiber sources.

28. The food product of claim 1 having a sugar content of less than 5%.

29. A method for preparing a high protein and high fiber containing food product, comprising the steps of:
   A. providing a hydrated, hot, worked, expandable food dough or plastic mass in an extruder having at least one screw and an exit die orifice comprising:
      sufficient amounts of at least one protein ingredient to provide a total protein content about 50% to 75% (dry weight) of the food product;
      sufficient amounts of at least one dietary fiber ingredient to provide a high, total fiber content of about 16.5-35% (dry weight); and,
      sufficient amounts of a starch containing ingredient to provide a starch content of about 5-25%;
      wherein the dough has a moisture content ranging from about 8% to 25%;
   B. extruding the dough or plastic mass under conditions to directly expand upon extrusion and forming the expanded mass into puffed pieces; and
   C. drying the puffed pieces to form high protein and high fiber containing puffed finished food products which are low in fat, soft and non-gritty, while exhibiting a minimum glassy texture.

30. The method of claim 29 wherein step A includes a sub-step of:
   working the dough by rotating the screw to impart sufficient amounts of Specific Mechanical Energy ranging from about 100 to 450 W-hr./kg.

31. The method of claim 30 wherein in step A prior to exiting through a die orifice the dough has
   a temperature ranging from about 110 to 180° C.;
   a moisture content of about 8% to 25%, and,
   a pressure ranging from about 2500 to 25,000 kPA (about 360 to 3625 psi).

32. The method of claim 31 wherein step A is practiced with:
   a residence time ranging from about 2 to 150 seconds.

33. The method of claim 32 wherein step A is practiced with a screw RPM ranging from about 600-800 RPM.

34. The method of claim 33 wherein in step A the extruder has an L/D ratio from about 4 to about 40.

35. The method of claim 32 wherein in step B the puffed pieces have a moisture content ranging from about 7 to 15%.

36. The method of claim 35 wherein in step B the puffed pieces are shaped into spheres, ovoids, strands, ribbons or flakes, ring or "O's", and mixtures thereof.

37. The method of claim 29 wherein at Least a portion of the fiber is provided by powdered cellulose.

38. The method of claim 29 wherein at least a portion of the fiber is provided by oat bran.

39. The method of claim 29 wherein at least a portion of the fiber is provided by inulin.

40. The method of claim 29 wherein the dough includes at least two protein ingredients.

41. The method of claim 40 wherein at least a portion of the protein is provided by soy protein concentrate, soy protein isolate, whey protein concentrate, whey protein isolate and mixtures thereof.

42. The method of claim 41 having a excess of whey protein concentrate or whey protein isolate than soy protein concentrate or soy protein isolate.

43. The method of claim 29 wherein the starch containing ingredient is selected from the group consisting of rice starch, corn starch, wheat starch, potato starch, rice flour, corn flour, wheat flour, oat flour and mixtures thereof.

44. The method of claim 29 wherein the extruder is a high speed twin screw extruder.

45. The method of claim 29 wherein step C is practiced to toast the pulled pieces to provide toasted finished puffed food products.

46. The method of claim 45 additionally comprising the step of applying a topical coating.

47. The method of claim 46 wherein the topical coating includes flavored particulates.

48. The method of claim 29 wherein step A is practiced using twin screw extruder.

* * * * *